US007642488B2

(12) United States Patent
Kim et al.

(10) Patent No.: US 7,642,488 B2
(45) Date of Patent: Jan. 5, 2010

(54) ELECTRIC OVEN

(75) Inventors: Hag Sin Kim, Gimhae-si (KR); Myeong Yeol Kang, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 11/413,174

(22) Filed: Apr. 28, 2006

(65) Prior Publication Data

US 2006/0186108 A1 Aug. 24, 2006

Related U.S. Application Data

(63) Continuation-in-part of application No. 10/733,399, filed on Dec. 12, 2003, now Pat. No. 7,060,940.

(30) Foreign Application Priority Data

Dec. 16, 2002 (KR) ...................... 10-2002-0080350
Dec. 16, 2002 (KR) ...................... 10-2002-0080351
Dec. 30, 2002 (KR) ...................... 10-2002-0086898

(51) Int. Cl.
*A21B 1/02* (2006.01)
*A21B 1/22* (2006.01)
*A21B 1/26* (2006.01)
*A21B 1/40* (2006.01)
*A21B 2/00* (2006.01)

(52) U.S. Cl. ....................... 219/400; 219/413; 219/484; 219/486; 219/494; 219/681; 219/685

(58) Field of Classification Search ....................... None
See application file for complete search history.

(56) References Cited

U.S. PATENT DOCUMENTS 2,035,767 A * 3/1936 Schulze ...................... 219/398
2,515,427 A * 7/1950 Schulze ...................... 219/398
2,732,476 A * 1/1956 Smith ......................... 219/504
3,889,099 A 6/1975 Nuss
4,096,369 A 6/1978 Tanaka et al.
4,601,279 A 7/1986 Guerin
5,045,671 A * 9/1991 Kanaya et al. .............. 219/411
5,204,503 A 4/1993 Maiellano, Jr. et al.
5,504,310 A 4/1996 Bae
5,688,422 A * 11/1997 Landwehr et al. ........... 219/491
5,695,668 A * 12/1997 Boddy ........................ 219/400
5,798,505 A 8/1998 Lee
5,918,589 A 7/1999 Valle et al.
6,093,918 A 7/2000 Sohn
6,114,664 A * 9/2000 Cook et al. ................. 219/400

(Continued)

FOREIGN PATENT DOCUMENTS

KR 20-1997-0044086 A 7/1997

(Continued)

*Primary Examiner*—Joseph M Pelham
(74) *Attorney, Agent, or Firm*—Birch, Stewart, Kolasch & Birch, LLP

(57) ABSTRACT

An electric oven includes a cooking cavity surrounded by an inner case and being openable by a door; a first heater for heating the cooking cavity; at least one supplemental heater for heating the cooking cavity; and a controller operating the first heater to generate heat when starting cooking and selectively operating the at least one supplemental heater during cooking.

19 Claims, 10 Drawing Sheets

U.S. PATENT DOCUMENTS

| | | | | |
|---|---|---|---|---|
| 6,316,749 | B1 * | 11/2001 | Bales et al. | 219/400 |
| 6,333,492 | B1 | 12/2001 | Graves et al. | |
| 6,541,746 | B2 * | 4/2003 | Kim et al. | 219/681 |
| 6,689,991 | B2 | 2/2004 | Kim et al. | |
| 6,987,252 | B2 * | 1/2006 | Graves et al. | 219/681 |
| 7,189,947 | B2 * | 3/2007 | Fulton | 219/490 |
| 7,208,701 | B2 * | 4/2007 | Fraccon et al. | 219/401 |
| 2001/0004069 | A1 | 6/2001 | Kim et al. | |
| 2002/0092842 | A1 | 7/2002 | Loveless | |
| 2003/0024925 | A1 | 2/2003 | Graves et al. | |
| 2003/0218002 | A1 * | 11/2003 | Fulton | 219/490 |
| 2007/0251936 | A1 * | 11/2007 | Nam et al. | 219/413 |

FOREIGN PATENT DOCUMENTS

| | | | |
|---|---|---|---|
| KR | 0141514 | Y1 | 3/1999 |
| KR | 10-1999-0031172 | A | 5/1999 |
| KR | 2001-0057088 | A | 7/2001 |
| KR | 2002-0036600 | A | 5/2002 |
| KR | 10-2002-0041252 | A | 6/2002 |
| KR | 10-2002-0057155 | A | 7/2002 |

* cited by examiner

ELECTRIC OVEN

This application is a Continuation-In-Part of application Ser. No. 10/733,399 filed on Dec. 12, 2003, now U.S. Pat. No. 7,060,940, the entire contents of which are hereby incorporated by reference. In addition, this application claims the benefit of the Korean Application Nos. P2002-0080350 filed on Dec. 16, 2002, P2002-0080351 filed on Dec. 16, 2002, and P2002-0086898 filed on Dec. 30, 2002, which are hereby incorporated by reference.

BACKGROUND OF THE INVENTION

1. Field of the Invention

The present invention relates to electric ovens, and more particularly, to an electric oven, which has an improved structure for smooth circulation of air inside of the electric oven.

2. Background of the Related Art

In general, the electric oven cooks food, not by burning gas like a gas oven, but by elevating a temperature inside of the oven with electricity or by directing a microwave to food.

The electric oven is favored by consumers in light of no generation of flame, and no gas leakage hazard, leading to cause less accidents coming from negligence of safety than the gas oven.

In the meantime, the electric oven is provided with components, such as the heater and a magnetron, and the like for heating the food. The heater is mounted in an upper side or a lower side of a cooking cavity for heating the food when power is provided thereto. However, since the heater has a very high temperature, the heater may heat, or burn the food partially, when the heater is arranged close to a tray in the cooking cavity. On the other hand, when the heater is arranged far from the tray in the cooking cavity, a failure in proper transmission of the heat from the heater to the food may be caused, to fail to properly cook the food. Therefore, it is required to improve a structure for efficient transmission of heat from the heater to the food on the tray.

Moreover, since the heater has a very high temperature, there is a risk of overheating if the heater is not cooled, effectively. The overheating of the heater may shorten a lifetime of the heater and cause failure of operation and accidents coming from negligence of safety.

In the meantime, a temperature of the cooking cavity is elevated together with the food by the heater or the microwave generated at the magnetron. Consequently, a temperature of the door of the cooking cavity that receives heat from the cooking cavity is elevated to a high temperature. Because the door is always exposed to the user, it is likely that the user is burned or an accident coming from negligence of safety occurs, when the door happens to come into contact with the user.

SUMMARY OF THE INVENTION

Accordingly, the present invention is directed to an electric oven that substantially obviates one or more of the problems due to limitations and disadvantages of the related art.

An object of the present invention is to provide an electric oven, which has an improved structure for uniform transmission of heat from a heater to food in the cooking cavity.

Other object of the present invention is to provide an electric oven, which has an improved structure for preventing overheating of components starting from a heater, effectively.

Another object of the present invention is to provide an electric oven, which has an improved cooling structure for preventing the door from involved in temperature rise due to a cooking cavity temperature.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the electric oven includes a cooking cavity surrounded by an inner case and being openable by a door; a first heater for heating the cooking cavity; at least one supplemental heater for heating the cooking cavity; and a controller operating the first heater to generate heat when starting cooking and selectively operating the at least one supplemental heater during cooking.

In another aspect of the present invention, the electric oven includes an outer case, an inner case, a heater cover, at least one heater, a fan housing, and a fan. The outer case has a door mounted in a front part thereof, the inner case in the outer case, and the inner case has a plurality of holes in an upper part thereof. The heater cover is located over the holes, and the heater is under the heater cover. The fan housing is attached to an inside wall of the inner case, and has a plurality of apertures. The fan is between the fan housing and an inside wall of the inner case, for drawing air from the cooking cavity and blowing a portion, or all of the air toward the heater.

It is preferable that the fan housing is arranged opposite to the door. The holes include first holes formed in a part opposite to the door, and second holes between the first holes and the door. The heaters include a first heater arranged over the first holes, and a second heater arranged over the second holes. The first heater may be a halogen heater, and the second heater may be a ceramic heater.

Preferably, the heaters are provided in spaces in communication with each other. The apertures may include a plurality of first apertures in a front surface of the fan housing, and at least one second aperture in an upper surface of the fan housing.

In the meantime, the electric oven further includes third holes in the upper part of the inner case adjacent to the door, a second heater cover over the third holes, and a third heater between the second heater cover and the third holes.

The electric oven may further include at least one fourth heater between the fan housing and the inside wall of the inner case. The fourth heater includes at least one of a sheath grill heater and the ceramic heater.

The electric oven may further include a temperature sensor under the heater cover. In this case the temperature sensor may be arranged to measure a temperature of the halogen heater. In the meantime, the electric oven may further include a fifth heater provided along a space in the upper part of the cooking cavity, when the fifth heater may be a sheath grill heater.

In other aspect of the present invention, there is provided a method for controlling an electric oven for preventing overheating of heaters and a cooking chamber. The method includes making a halogen heater and a ceramic heater to generate heat in starting cooking, the halogen heater and the ceramic heater being provided in an upper part of an inner case having a cooking cavity formed therein, measuring a temperature of the halogen heater, and comparing the measured temperature of the halogen heater and a preset temperature, to make a sheath grill heater in the cooking cavity to generate heat, if the temperature of the halogen heater is lower than the preset temperature, and to cut off power to the sheath grill heater, if the temperature of the halogen heater is higher than the preset temperature.

In another aspect of the present invention, there is provided an electric oven including an outer case having air suction holes and air discharge holes, an inner case, a heater cover, at least one heater, and a fan between the inner case and the outer case. There is a door mounted in a front part of the outer case, and the inner case is provided in the outer case. The inner case has a cooking chamber therein, and a plurality of holes in an upper part thereof. The heater cover is located over the holes, and the heater is under the heater cover. The fan draws air through the air inlet holes and discharges the air through the air outlet holes to cool the inner case and the heater cover.

The air inlet holes are formed at least in a lower part of a front surface of the outer case or a lower part of a rear surface, and the air outlet holes are in an upper part of a front surface of the outer case. The fan is above an upper part of rear of the inner case for drawing air from a lower part and discharging toward a front part.

The holes include first holes formed in a side opposite to the door, and second holes formed between the first holes and the door. The heater includes a first heater over the first holes, and a second heater over the second holes. The first heater is a halogen heater and the second heater is a ceramic heater.

The electric oven may further include at least one partition plate on an upper side of the heater cover for guiding air from the fan so that a flow of the air becomes a plurality of laminar flows. The electric oven may further include at least one partition plate for dividing a space, for example, on the upper side of the heater cover into a plurality of layers. The at least one partition plate includes a first partition plate spaced a distance away from an upper surface of the heater cover, and a second partition plate spaced a distance away from an upper surface of the first plate. The first partition plate is bent so as to be in conformity with a part of the heater cover. The partition plates have one ends arranged adjacent to the fan, and the other ends arranged adjacent to the air outlet holes.

The electric oven may further include third holes in an upper part of the inner case adjacent to the door, a fan housing over the third holes, and a centrifugal fan between the fan housing and the third holes for blowing air from the cooking cavity to the heaters.

The electric oven may further include a second fan housing attached to an inside surface of the inner case, the second fan housing having a plurality of apertures, a second fan between the second fan housing and an inside wall of the inner case for drawing air from the cooking cavity, and blowing a portion or all of the air toward the heater, and a fan motor between the inner case and the outer case for rotating the second fan. The fan motor is arranged on a suction side of the fan so as to be cooled by the air introduced into the fan through the air inlet holes. The apertures include a plurality of first apertures in a front surface of the fan housing, and at least one second aperture in an upper surface of the fan housing. The electric oven may further include a sheath grill heater in an upper part of the cooking cavity.

In further aspect of the present invention, there is provided an electric oven and a door having an improved structure for preventing overheating. The electric oven includes an outer case, an inner case, a fan between the inner case and the outer case, and a door mounted in a front part of the outer case for opening/closing the door. The outer case has air suction holes and air discharge holes formed therein, and the inner case therein. The inner case has a cooking cavity formed therein, and the fan draws air through the air suction holes and discharges the air through the air discharge holes. The door has an air inlet hole in one side of a door frame for introduction of air circulated by the fan, an air outlet hole in the other side of the door frame for discharging the air to an outside of the electric oven, and an air passage in the door to make the air inlet hole and the air outlet hole in communication.

It is preferable that the air discharge holes are formed right over the door. The fan is arranged above an upper part of rear of the inner case for cooling an outfit chamber in a space between the upper part of the inner case and an upper part of the outer case. The air inlet hole is in an upper side of the door frame, and the air outlet hole is in a lower side of the door frame. The air passage is formed along a rear surface of a plate of glass in a front surface of the door.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, identical parts will be given the same names and reference symbols, and repetitive description of which will be omitted.

Figure 1:
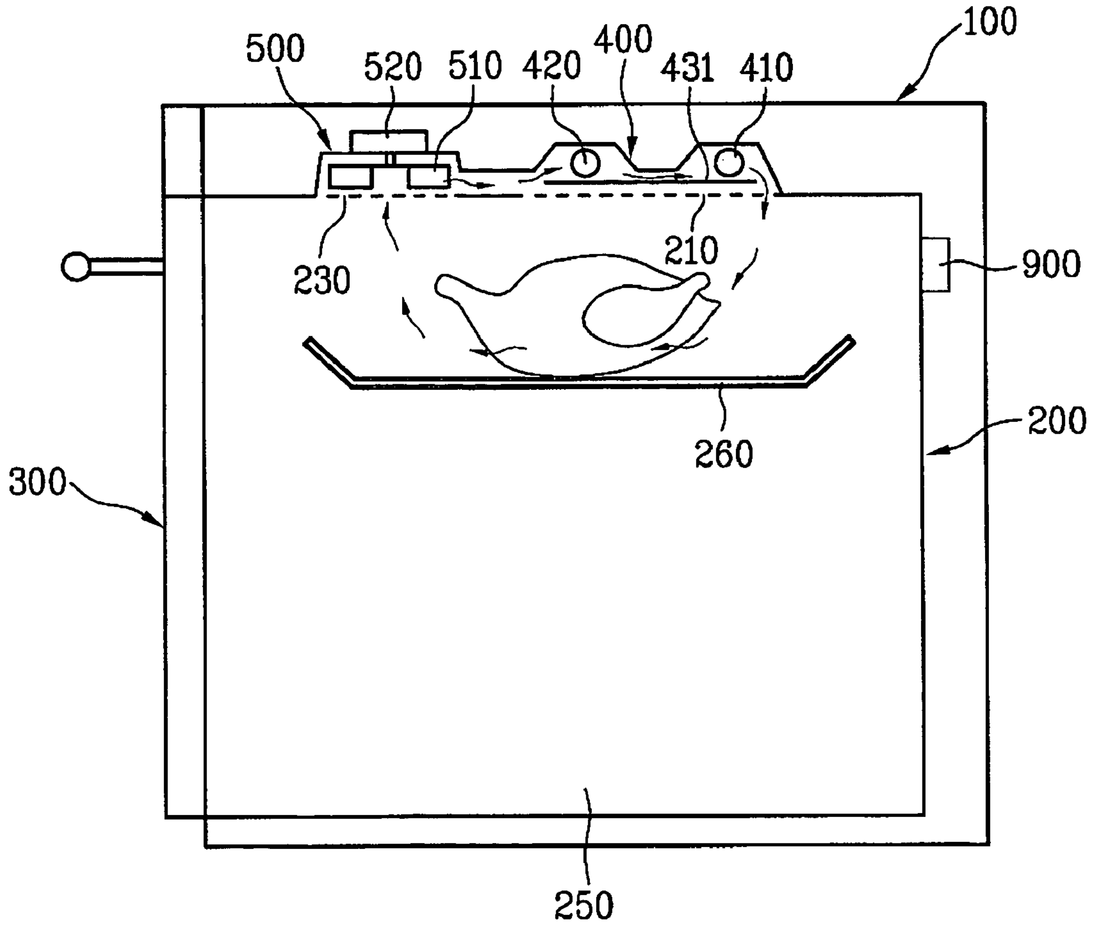
FIG. 1 illustrates a diagram showing an electric oven in accordance with a preferred embodiment of the present invention.

FIG. 1 illustrates a diagram showing an electric oven in accordance with a preferred embodiment of the present invention. Referring to FIG. 1, the electric oven includes an outer case 100, an inner case 200, and a door 300. The outer case 100 forms an exterior of the electric oven and has an opened front. The inner case 200 is mounted in the outer case 100, and has a cooking cavity 250 for receiving food for cooking. The door 300 is mounted to a front part of the outer case 100 for opening/closing the cooking cavity 250. The electric oven further includes a magnetron 900 for providing the cooking cavity 250 with microwaves to heat the food.

There is a tray 260 in the inner case 200, i.e., the cooking cavity 250 for placing food to be cooked, and, as shown in FIG. 1, the cooking cavity 250 has a plurality of holes 210 and 230 in an upper part 200 thereof, in a ceiling thereof. Of the holes 210 and 230, the holes 230 are provided adjacent to, for example, the door 300 for discharging air from the cooking cavity 250 to an outside of the cooking cavity 250, and the first holes 210 are provided adjacent to, for example, an opposite side of the door 300 for receiving the air discharged to the outside of the cooking cavity 250 again.

In the meantime, as shown in FIG. 1, of the upper part of the inner case 200, there are a fan housing 500 over the third holes 230, and a centrifugal fan 510 between the fan housing 500 and the third hole 230. The fan motor 520 which rotates the centrifugal fan 510 is mounted over the fan housing 500. As shown in FIG. 1, of the upper part of the inner case 200, there are a heater cover 400 over the first holes 210, a first heater 410, and a second heater 420 between the heater cover 400 and the first holes 210. The first heater 410 and the second heater 420 may be a ceramic heater and a halogen heater, respectively. As shown in FIG. 1, there may also be a third heater 431 between the first and second heaters 410 and 420 and the first holes 210. The third heater 431 may be a sheath grill heater. The fan housing 500 and the heater cover 400 can be connected to each other, and the heat cover 400 may be a reflective plate for effective reflection of the heat from the heaters 410, 420, and 431. In addition, the holes 210 and 230 are configured to prevent the microwaves in the cooking cavity from being transmitted to the heaters 410, 420 and 431 and the fan 510, thereby protecting the heaters 410, 420 and 431 and the fan 510. In particular, the holes 210 and 230 are configured to have a size or a diameter smaller than a half of the wavelength of the microwaves so as to prevent the microwaves in the cooking cavity from being transmitted to the heaters 410, 420 and 431 and the fan 510.

The electric oven is operative as follows. When power is provided to the electric oven in a state food is placed on the tray 260, the first to third heaters 410, 420, and 431 generate heat, to heat the cooking cavity 250 in the inner case 200. At the same time, when the fan motor 520 operates to rotate the centrifugal fan 510, the air is led from the cooking cavity 250 through the third holes 230 to, and heated at, the first to third heaters 410, 420, and 431. In this instance, the first to third heaters 410, 420, and 431 are cooled down as the first to third heaters 410, 420, and 431 heat exchanges with the air. As shown in FIG. 1, the heated air is introduced into the cooking cavity 250 again through the first holes 210, and heats the food on the tray 260.

Thus, the electric oven shown in FIG. 1 heats the food in the cooking cavity 250 by heating the air with a plurality of heaters 410, 420, and 431, and circulating the heated air with the centrifugal fan 510. However, since the electric oven shown in FIG. 1 has no extra structure for cooling the heater cover 400 which surrounds the heaters 410 and 420, the heater cover 400 is heated, to heat the heaters 410, 420, and 431, that shorten lifetimes of the heaters 410, 420, and 431. Moreover, for determining a temperature of the cooking cavity 250, not only a temperature caused by heating of the heaters 410, 420, and 431, but also a temperature caused by heating of the heater cover 400, a complicated control for selectively heating the heaters 410, 420, and 431 is required. Furthermore, since an air flow path is concentrated only to the upper part of the cooking cavity 250, it is required that the tray 260 is positioned as close to the upper part of the cooking cavity 250 as possible.

Figure 2:
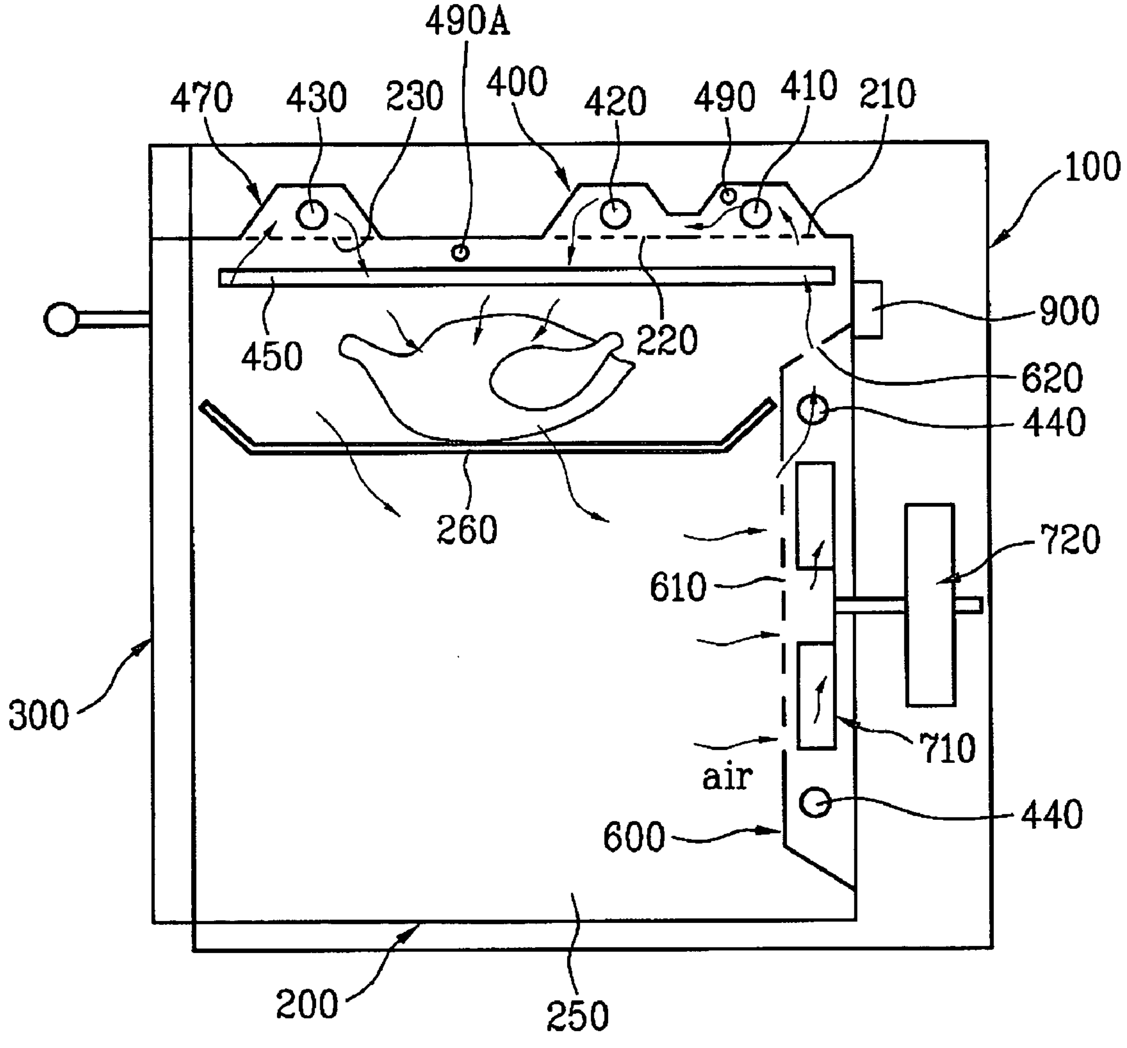
FIG. 2 illustrates a diagram showing an electric oven in accordance with a first preferred embodiment of the present invention.

In the meantime, the first embodiment of the present invention provides a structure for solving the problems. FIG. 2 illustrates a diagram showing an electric oven in accordance with a first preferred embodiment of the present invention.

Referring to FIG. 2, the electric oven includes an outer case 100, an inner case 200, a heater cover 400, at least one heater, a fan housing 600, and a fan 710. The outer case 100 has an opened front, to which a door 300 is rotatably mounted. The inner case 200, provided in the outer case 100, has an opened front part opened/closed by a door 300. As shown in FIG. 2, the inner case 200 forms a cooking cavity 250, having a tray 260 therein for placing food to be cooked thereon. Of course, the tray 260 may be rotatable. The electric oven further includes a magnetron 900 for providing the cooking cavity 250 with microwaves to heat the food.

Referring to FIG. 2, there are a plurality of holes 210 and 220 in the upper part of the inner case 200. As shown in FIG. 2, there are a heater cover 400 over the holes 210 and 220, and heaters 410 and 420 between the heater cover 400 and the holes 210 and 220. As shown in FIG. 2, it is preferable that heater cover 400 is formed such that the heaters 410 and 420 are arranged in a space in communication with each other. It is preferable that the heater cover 400 is a reflective plate for effective reflection of heat from the heaters 410 and 420 to the cooking cavity 250.

In the meantime, as shown in FIG. 2, in the first embodiment, the holes 210 and 220 may include first holes 210 and second holes 220. As shown in FIG. 2, of the upper part of the inner case 200, the first holes 210 are far from the door 300, and the second holes 220 are between the first holes 210 and the door 300. In this instance, of the heaters 410 and 420, the first heater 410 may be arranged over the first holes 210, and the second heater 420 may be arranged over the second holes 220. Therefore, as shown in FIG. 2, the heaters 410 and 420 are positioned far from the door 300. The first heater 410 and the second heater 420 may be, for example, a halogen heater and a ceramic heater, respectively. In addition, the holes 210 and 220 are configured to prevent the microwaves in the cooking cavity from being transmitted to the heaters 410 and 420, thereby protecting the heaters 410 and 420. In particular, the holes 210 and 220 are configured to have a size or a diameter smaller than a half of the wavelength of the microwaves so as to prevent the microwaves in the cooking cavity from being transmitted to the heaters 410 and 420.

Referring to FIG. 2, the electric oven in accordance with a first preferred embodiment of the present invention may further include a temperature sensor 490 between the holes 210 and 220 and the heater cover 400 for measuring a temperature of the heaters 410 and 420. In this case, it is preferable that the temperature sensor 490 measures a temperature of the halogen heater. According to this, as shown in FIG. 2, it is preferable that the temperature sensor 490 is arranged adjacent to the first heater 410, the halogen heater, between the first holes 210 and the heater cover 400. In addition, the electric oven may also include another temperature sensor 490A for measuring a temperature of the cooking cavity.

Referring to FIG. 2, the fan housing 600 is attached to an inside wall of the inner case 200, for example, opposite to the door 300 projected toward the door 300, slightly. Then, there is a slight space between the fan housing 600 and the inside wall of the inner case 200, in which, as shown in FIG. 2, the fan 710 is provided, which is connected to a fan motor 720 arranged between the inner case 200 and the outer case 100. The fan 710 may be, for example, a centrifugal fan for drawing air in an axial direction and discharging the air in a radial direction.

The fan housing 600 has a plurality of apertures 610 and 620. As shown in FIG. 2, the apertures 610 and 620 may include first apertures 610 for introducing air into the cooking cavity 250, and second apertures 620 for discharge the introduced air. A plurality of the first apertures 610 are formed in a front surface of the fan housing 600, i.e., a surface opposite to the door 300 so that the fan 710 draws air from the cooking cavity 250. At least one second aperture 620 is formed in a side surface, for example, an upper surface of the fan housing 600, so that the fan 710 blows the air to the heaters 410 and 420. When the second aperture 620 is formed only in the upper surface of the fan housing 600, most of the air drawn into the fan 710 is blown to the heaters 410 and 420. If the second aperture 620 is formed in other side of the fan housing 600 too, a portion of the air drawn into the fan 710 from the cooking cavity 250 is blown to the heaters 410 and 420, and the other portion of the air is blown to the cooking cavity 250, again.

In the meantime, as shown in FIG. 2, there may be a fourth heater 440 between the fan housing 600 and the inside wall of the inner case 200. As shown in FIG. 2, the fourth heater 440 may be one, or two provided in an upper part and a lower part of the fan 710. The fourth heater may include at least one of, for example, a sheath grill heater and a ceramic heater. Meanwhile, considering that in general the electric heater carries out cooking for a long time period, it is more important than anything else to elevate an inside temperature of the inner case 200 uniformly. Moreover, for the price competitiveness sake, it is preferable that less expensive components are used if performances are similar. According to this, the fourth heater 440 in accordance with a first preferred embodiment of the present invention may include only a grill heater. In addition, the apertures 610 and 620 are configured to prevent the microwaves in the cooking cavity from being transmitted to the fan 710 and the heater 440, thereby protecting the fan 710 and the heaters 440. In particular, the apertures 610 and 620 are configured to have a size or a diameter smaller than a half of the wavelength of the microwaves so as to prevent the microwaves in the cooking cavity from being transmitted to the heater 440 and the fan 710.

Referring to FIG. 2, the electric oven in accordance with a first preferred embodiment of the present invention may further include a third heater 430 in the upper part of the inner case 200 in addition to the first heater 410 and the second heater 420. In this case, of the upper part of the inner case 200, third holes 230 are provided to a part adjacent to the door 300, and a second heater cover 470 is provided over the third holes 230. According to this, a space is formed between the third holes 230 and the second heater cover 470, and, as shown in FIG. 2, the third heater 430 is arranged in the space. The third heater 430 may be, for example, a ceramic heater. In addition, the holes 230 are configured to prevent the microwaves in the cooking cavity from being transmitted to the heater 430, thereby protecting the heater 430. In particular, the holes 230 are configured to have a size or a diameter smaller than a half of the wavelength of the microwaves so as to prevent the microwaves in the cooking cavity from being transmitted to the heater 430.

Referring to FIG. 2, the electric oven in accordance with a first preferred embodiment of the present invention may further include a fifth heater 450 arranged along the upper space of the cooking cavity 250. The fifth heater 450 may be, for example, a sheath grill heater.

Figure 3:
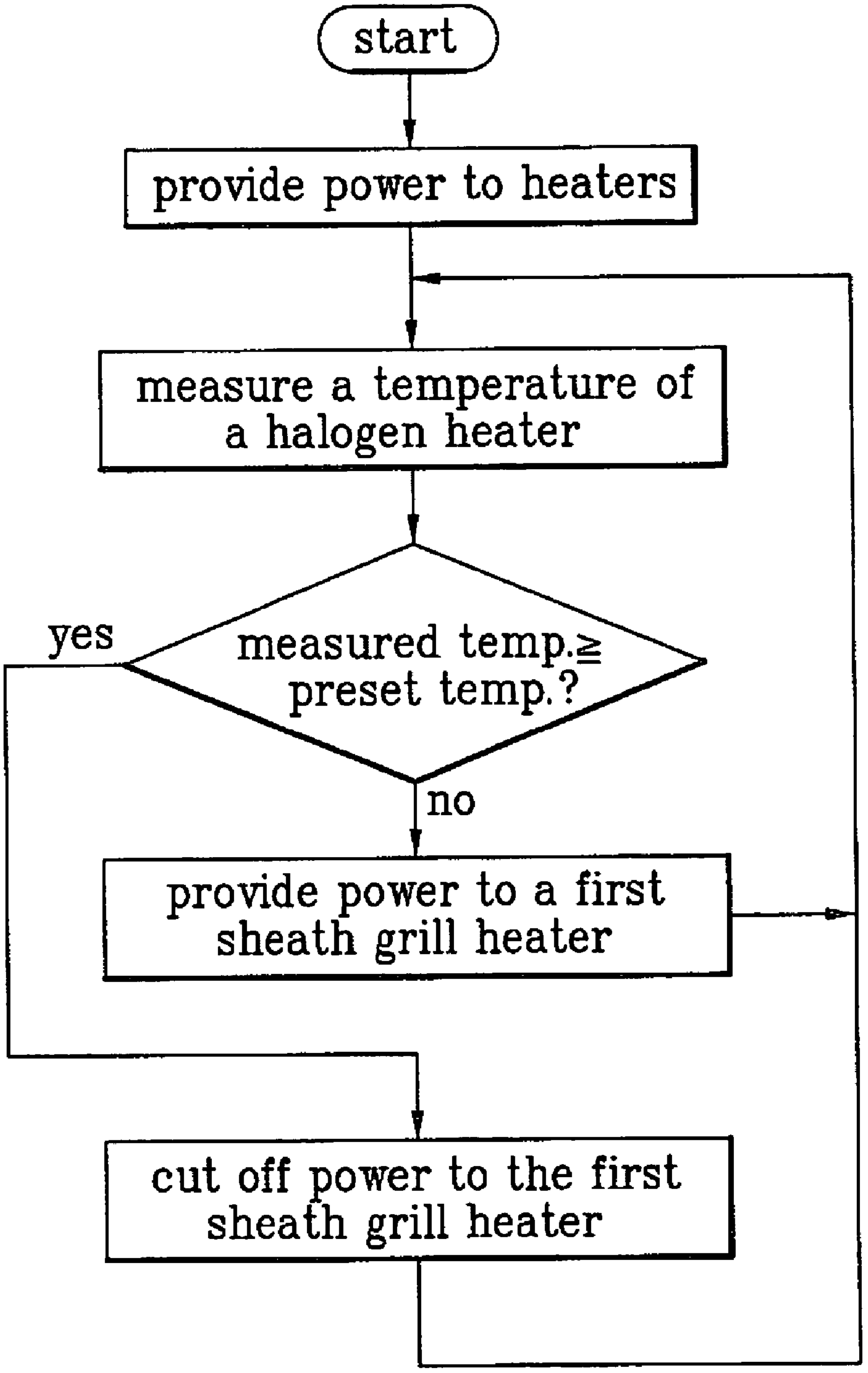
FIG. 3 illustrates a flow chart showing a method for controlling an electric oven in accordance with a preferred embodiment of the present invention.

The operation of the electric oven in accordance with a first preferred embodiment of the present invention will be described. FIG. 3 illustrates a flow chart showing a method for controlling an electric oven in accordance with a preferred embodiment of the present invention. When the user places food on the tray 260, and provides power to the electric oven, the first heater 410, a halogen heater, and/or the second heater 420, a ceramic heater, generate heat. The heat from the first heater 410 and/or the second heater 420 is transmitted to the cooking cavity 250, directly, or after reflected at the heater cover 400.

In the meantime, the fan 710 also rotates as the power is provided to the electric oven. According to this, the air in the cooking cavity 250 is drawn to the fan 710 through the first apertures 610, and discharged through the second apertures 620. The discharged air moves to the first heater 410 through the first holes 210, and heated as the air passes through the first heater 410 and the second heater 420 in succession. Since the heated air moves to the food on the tray 460 in the cooking cavity 250 through the second holes 220, the food receives the heat from the first heater 410 and the second heater 420, more effectively. Moreover, since the air cools the first heater 410 and the second heater 420, overheating of the first heater 410 and the second heater 420 is prevented. If the third heater 430 is provided, the third heater 430 heats the food located adjacent to the door 300, more effectively.

During the process, an air flow passed through the first holes 210 is guided by the heater cover 400. According to this, as shown in FIG. 2, it is preferable that the heater cover 400 is designed such that air passed through the first holes 210 passes the first heater 410 and the second heater 420, and escapes through the second holes 220 smoothly.

In the meantime, during the cooking process, the temperature sensor 490/490A keeps measuring a temperature of the first heater 410, the halogen heater and/or a temperature of the cooking cavity 250. The temperature measured by the temperature sensor 490/490A is transmitted to a controller (not shown), and the controller compares the temperature measured by the temperature senor to a preset temperature, and controls the second heater 420, the third heater 430, and the fourth heater 440 that is the sheath grill heater, by using a compared value. A process for the controller to control the fourth heater 440 will be described.

If the temperature preset at the controller is below a predetermined temperature, the controller will selectively operate one or more of the supplemental heaters such as the second heater 420, the third heater 430, and the fourth heater 440 to quickly raise the temperature. For example, if the temperature preset at the controller is 500° C., the controller provides power to the fourth heater 440 if the temperature measured at the temperature sensor 490/490A is below 500° C. Then, the fourth heater 440 generates heat to elevate the temperature of the cooking chamber 250 to a high temperature, uniformly. This supplements a disadvantage of the halogen heater which generates heat at a high temperature, instantly. That is, though the halogen heater generates heat at a high temperature instantly, the halogen heater cannot heat the cooking chamber temperature uniformly, failing to transmit heat to the food uniformly. Therefore, if power is provided to the fourth heater 440, the sheath grill heater, because the fourth heater 440 heats the cooking cavity 250 uniformly, a problem caused when only the halogen heater is used can be solved. The same process applied to the fourth heater 440 can also be applied to the second heater 420 and the third heater 430.

In another embodiment, the controller may, based on the temperature of the first heater 410 or the temperature of the cooking cavity 250, selectively operate one of the supplemental heaters which has a largest heat output among the supplemental heaters.

In still another embodiment, the controller can operate at least one of the supplemental heaters when a rising rate of the temperature of the first heater 410 or the temperature of the cooking cavity 250 in a time period fails to reach a preset rate value; and the controller can stop operating the at least one of the supplemental heaters when the rising rate of the temperature of the first heater 410 or the temperature of the cooking cavity 250 reaches the preset rate value. For example, when the rising rate is below the preset rate, the controller can selectively operate one or more of the supplemental heaters or one of the supplemental heaters which has a largest heat output among the supplemental heaters.

In the meantime, the temperature preset at the controller may be the highest allowable temperature that secures a long lifetime of the first heater 410, the halogen heater. However, the temperature preset at the controller may be temperatures set separately for cooking different kinds of food at optimal conditions.

If the temperature preset at the controller reaches or is higher than the predetermined temperature, the controller can stop operating one or more of the supplemental heaters such as the second heater 420, the third heater 430, and the fourth heater 440. For example, if the temperature measured at the temperature senor 490/490A is higher than 500° C., the controller cuts power to the fourth heater 440, to prevent overheating of the cooking cavity 250. In this instance, the power is kept provided to the first heater 410.

During the cooking process, as shown in FIG. 3, the temperature sensor 490/490A keeps measuring the temperature of the first heater 410 and/or the temperature of the cooking cavity 250, and the controller compares the measured temperature to the preset temperature, and controls the supplemental heaters such as the second heater 420, the third heater 430 and the fourth heater 440.

In the meantime, the fifth heater 450, the sheath grill heater, in the electric oven of the present invention can be also controlled by the controller so as to be operated identically to the fourth heater 440, or to keep generating heat during the cooking process. Meanwhile, different from this, the controller may control the fifth heater 450, and control the fourth heater 440 to keep generating heat during the cooking process.

In another embodiment, the controller can operate one or more of the supplemental heaters after a preset time period starting from an initial operation of the first heater 410 passes. For example, after the first heater 410 operates for one minute, the controller operates the one or more of the supplemental heaters to heat the food.

In still another embodiment, the controller operates one or more of the supplemental heaters after the first heater 410 operates for a while so that the temperature of the first heater 410 or the temperature of the cooking cavity 250 reaches a preset temperature. The controller operates one or more of the supplemental heaters with a duty cycle having an on-time period and an off time period of the one or more supplemental heaters. After a predetermined time period, starting from an operation of the one or more supplemental heaters, has passed, the controller may reduce the ratio of the on-time period in the duty cycle. For example, the first heater 410 starts to generate heat and raises its temperature or the temperature of the cooking cavity. When the temperature of the first heater 410 or the cooking cavity reaches 200° C., the controller starts to operate one or more supplemental heaters with a duty cycle having 50% on-time period and 50% off-time period. After the one or more supplemental heaters operate for a predetermined time period, e.g., 5 minutes, the controller may adjust the on-time period and off-time period to be 40% and 60%, respectively. The controller may further reduce adjust the on-time period and off-time period to be 30% and 70%, respectively, after another time period, e.g., 10 minutes, has passed.

Thus, the electric oven in accordance with a first preferred embodiment of the present invention includes a plurality of heaters provided to different parts of the cooking cavity 250, evenly. The heat from the first heater 410 and the second heater 420 is transmitted to the food on the tray 260, not only by radiation and conduction, but also by convection. Accordingly, the food in the cooking cavity 250 can be heated uniformly.

In the electric oven in accordance with a first preferred embodiment of the present invention, the fan 710 in one side part of the cooking cavity 250 circulates the air through the cooking cavity 250 uniformly, and cools down the heaters. According to this, partial heating of the cooking cavity 250, and overheating of the heaters can be prevented.

The method for controlling electric oven of the present invention can prevent partial heating of the cooking cavity, and reduce a load on the halogen heater by elevating the cooking cavity temperature uniformly by using the sheath grill heater at the time the temperature of the halogen heater is low at an initial stage of cooking, and also can prevent overheating of the heaters and the cooking cavity by cutting off power to the sheath grill heater when the temperature of the halogen heater is high.

Figure 4:
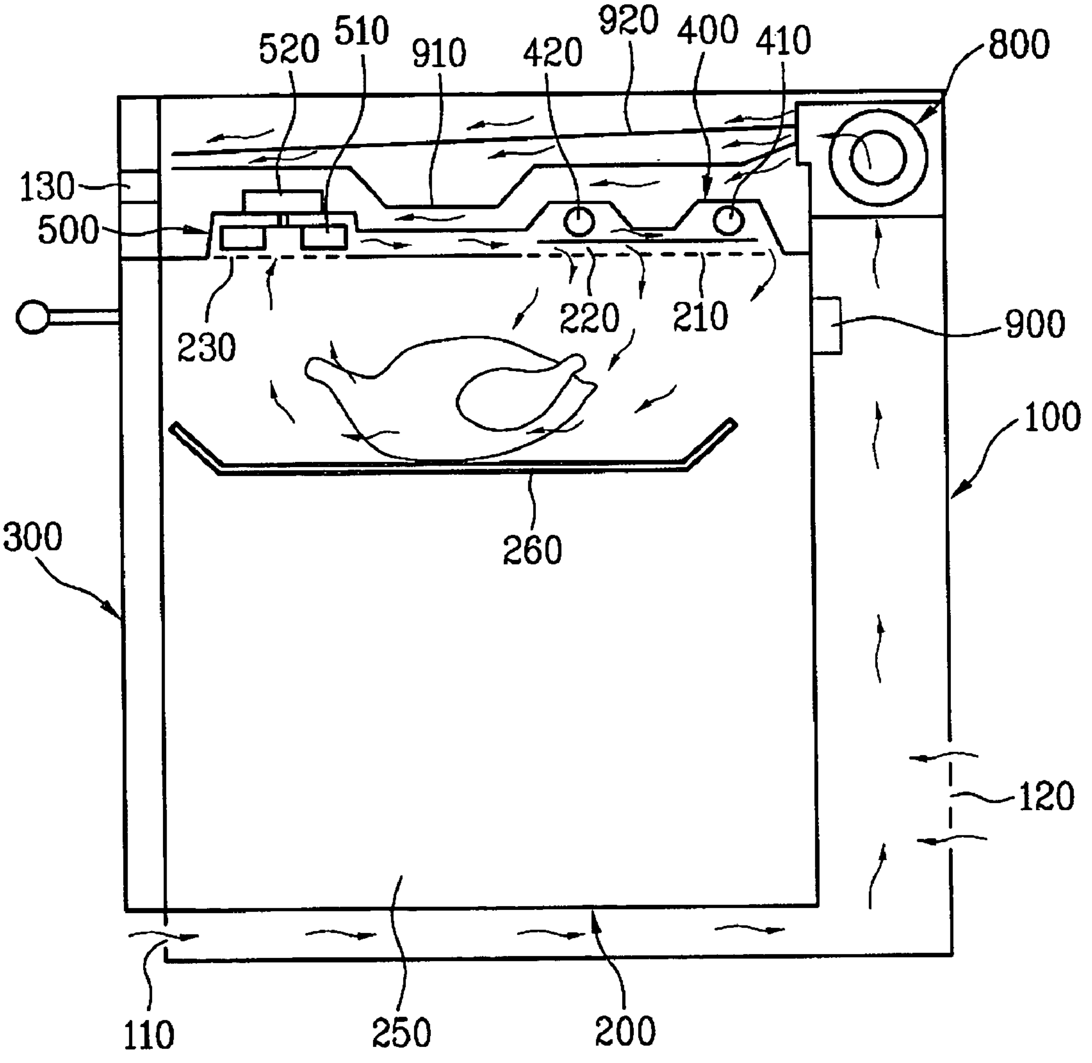
FIG. 4 illustrates a diagram showing an electric oven in accordance with a second preferred embodiment of the present invention.

FIG. 4 illustrates a diagram showing an electric oven in accordance with a second preferred embodiment of the present invention.

Referring to FIG. 4, the electric oven includes an outer case 100 having air inlet holes 110, and 120 and air outlet holes 130, an inner case 200 provided in the outer case 100, a heater cover 400, at least one heaters 410, and 420 under the heater cover 400, and a fan 800 between the inner case 200 and the outer case 100. The electric oven further includes a magnetron 900 for providing the cooking cavity 250 with microwaves to heat the food.

The air inlet holes 110, and 120 are either in a lower part of a front surface, or lower part of a rear surface of the outer case 100, or both. The air outlet holes 130 are in an upper part of the front surface of the outer case 100. In this case, the fan 800 is above an upper part of rear surface of the inner case 200, for drawing air through the air inlet holes 110 and 120, and discharging the air through the air outlet holes 130.

The heater cover 400 and the heaters 410 and 420 are provided to positions identical to the embodiment described with reference to FIG. 2, of which descriptions will be omitted. The holes 210, and 220 may include first holes 210 far from the door 300, and the second holes 220 between the first holes 210 and the door 300. The first holes 210 and the second holes 220 may be formed continuous to each other.

Above structure can prevent overheating of the cooking cavity 250 and the heater cover 400 as the air introduced through the air inlet holes 110, and 120 moves through, and cools a bottom part and a rear part of the inner case 200, as well as the heater cover 400.

The electric oven may further include at least one partition plate 910, and 920. The partition plates 910, and 920 guide an air flow discharged toward the air outlet holes 130 from the fan 800 and moves to the upper part of the inner case 200 to form a plurality of laminar flows. The partition plates 910, and 920 may be arranged, for example, to divide a space of the upper part of the heater cover 400. FIG. 4 illustrates an example two partition plates 910, and 920 are provided, wherein the first partition plate 910 is arranged so as to be spaced a distance away from an upper surface of the heater cover 400 over the heater cover 400, and the second partition plate 920 is arranged so as to be spaced a distance away from an upper surface of the first partition plate 910 over the first partition plate 910.

The first partition plate 910 may be bent in conformity with a part of the heater cover 400 for more efficient reception of heat from the heater cover 400. The partition plates 910, and 920 have one ends adjacent to the fan 800, and the other end adjacent to the air outlets 130. It is preferable that there is a gap between the other ends adjacent to the air outlet holes 130 and the air outlet holes 130 for making respective layers in communication.

If there are the plurality of partition plates 910 and 920 between the heater cover 400 and the outer case 100, air from the fan 800 flows in a laminar form, making heat transfer efficiency better. Moreover, since the partition plates 910 and 920 between the laminar flows transfer a portion of heat of the partition plates 910 and 920 upward, and discharge rest of the heat to an outside of the electric oven through the air outlet holes 130, heat discharge to the outside of the electric oven is progressed faster, thereby cooling the heaters 410 and 420 and the heater cover 400 effectively, to prevent overheating thereof.

In the meantime, the electric oven may further include a centrifugal fan 510 for blowing air from the cooking cavity 250 to the heaters 410 and 420. In this case, the electric oven further includes third holes 230, a fan housing 500, and a centrifugal fan 510. The third holes 230 are in the upper surface of the inner case 200 adjacent to the door 300, and the fan housing 500 is over the third holes 230. One side of the fan housing 500 may be connected to one side of the heater cover 400, to make a lower space of the fan housing 500 in communication with a lower space of the heater cover 400 the heaters 410 and 420 are arranged therein.

If the centrifugal fan 510 is provided, the centrifugal fan 510 can blow air from the cooking cavity 250 to the first heater 410 and the second heater 420, and from the first heater 410 and the second heater 420, after being heated, back to the cooking chamber 250, to heat the food. Accordingly, as the first heater 410 and the second heater 420 can be cooled more effectively, overheating of the heaters 410 and 420 can be prevented. Moreover, since heated air is supplied to the cooking cavity 250 and the air in the cooking cavity 250 is drawn again, the air in the cooking cavity 250 circulates, smoothly. According to this, the partial heating of the cooking cavity 250 is prevented, and the food can be heated at a uniform temperature.

The operation of the electric oven in accordance with a second preferred embodiment of the present invention will be described, taking a case the centrifugal fan 510 and the partition plates 910 and 920 are provided thereto as an example. When power is provided to the electric oven in a state the food is placed on the tray 260 in the cooking cavity 250, the first heater 410 and the second heater 420 generate heat, and the centrifugal fan 510 rotates. According to this, air is drawn into the centrifugal fan 510 through the third holes 230, blown to the second heater 420 and the first heater 410, heated at the second heater 420 and the first heater 410, introduced into the cooking cavity 250 through the first holes 210 and the second holes 220, and heats the food.

Since the air from the centrifugal fan 510 cools the first heater 410 and the second heater 420, there is no worry of overheating the heaters 410 and 420 and the heater cover 400. Moreover, since the heated air is made to circulate through the cooking cavity 250 smoothly by the centrifugal fan 510, the food in the cooking chamber 250 can be heated, uniformly.

At the same time with provision of the power, the fan 800 between the inner case 200 and the outer case 100 also rotates. According to this, the air outside of the electric oven is introduced between the inner case 200 and the outer case 100 through the air inlet holes 110 and 120, and is introduced into the fan 800. In this instance, the air introduced through the air inlet holes 110 in the front surface of the outer case 100 cools bottom surfaces of the inner case 200 and the outer case 100, and the air introduced through the air inlet holes in the rear surface of the outer case 100 cools the rear surfaces of the inner case 200 and the outer case 100. According to this, overheating of the cooking cavity 250 can be prevented, and a large amount of heat transmission from the cooking cavity 250 to an outside of the outer case 100 can be prevented, to prevent accidents caused by negligence of safety.

In the meantime, the air introduced into the fan 800 is discharged into a space between an upper side of the inner case 200 and the outer case 100, and discharged to an outside of the electric oven through the air outlet holes 130. In this instance, the first partition plate 910, and the second partition plate 920 guide the air to be laminar flow. The air flowing between the heater cover 400 and the first partition plate 910 receives heat from the heater cover 400, and transmits a portion of the heat to the first partition plate 910, and discharges rest of the heat to the outside of the electric oven through the air outlet holes 130. A portion of the heat transmitted to the first partition plate 910 is transmitted to the air flowing between the first partition plate 910 and the second partition plate 920, and therefrom to the second partition plate 920, and rest of the heat is discharged to the outside of the electric oven through the air outlet holes 130. A portion of the heat transmitted to the second partition plate 920 is transmitted to the air flowing between the second partition plate 920 and the outer case 100, and therefrom to the outer case 100, and rest of the heat is discharged to the outside of the electric oven through the air outlet holes 130. The heat transmitted to the outer case 100 is transmitted to air in the outside of the electric oven.

Thus, the plurality of laminar flow of the air from the fan 800 to the air outlet holes 130 can transfer or discharge heat quickly. Moreover, the heat exchange of the plurality of partition plates 910 and 920 with the flowing air increases a heat exchange area to make the heat exchange, well. Therefore, since the air from the fan 800 is discharged to the outside of the electric oven after heat exchanging with the partition plates 910 and 920, a temperature of the air discharged from the air outlet holes 130 is not so high. Therefore, there is no hazard of occurrence of accidents caused by negligence of safety coming from direct discharge of hot air to the outside of the electric oven. In addition to this, since the heaters 410 and 420 and the heater cover 400 can be cooled down effectively, reduction of a lifetime of the electric oven caused by overheating of the heaters 410 and 420 can be prevented.

Figure 5:
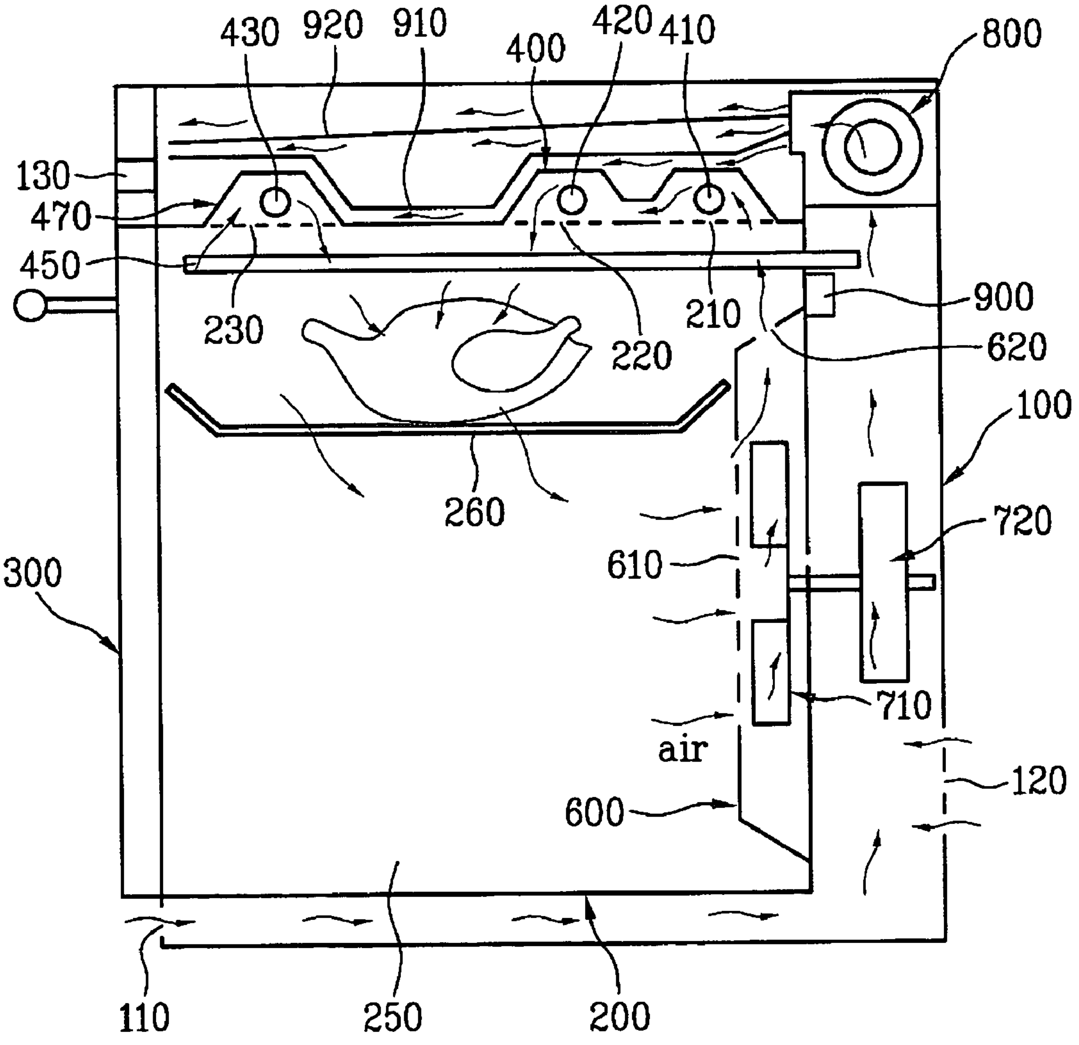
FIG. 5 illustrates a diagram showing a variation of an electric oven in accordance with a second preferred embodiment of the present invention.

A structure of the electric oven in accordance with a second preferred embodiment of the present invention is not limited to above, but a variation may be embodied in which characteristics of the first embodiment described with reference to FIG. 2 is added as shown in FIG. 3. FIG. 5 illustrates a diagram showing a variation of an electric oven in accordance with a second preferred embodiment of the present invention, referring to which a variation of the second embodiment will be described.

Referring to FIG. 5, the variation of the electric oven in accordance with the second preferred embodiment of the present invention includes an outer case 100 having air inlet holes 110 and 120, and air outlet holes 130, an inner case 200 having holes 210 and 220, heaters 410 and 420 and heater cover 400 over the holes 210 and 220, a fan 800 between the inner case 200 and the outer case 100, a fan housing 600 in an inside wall of the inner case 200 having a plurality of apertures 610 and 620, and a second fan 710 in the fan housing 600. As shown in FIG. 5, a fan motor 720 for rotating the second fan 710 is arranged on a suction side of the fan 800 so that the fan motor 720 is cooled by the air introduced into the fan 800 through the air inlet holes 110 and 120. The electric oven further includes a magnetron 900 for providing the cooking cavity 250 with microwaves to heat the food.

The electric oven may further include a third heater 430 for effective heating of the cooking cavity 250 adjacent to the door 300. In this case, the electric oven further includes third holes 230 in the upper surface of the inner case 200 adjacent to the door 300, a second heater cover 470 arranged over the third holes 230, and the third heater 430 between the second heater cover 470 and the third holes 230.

Moreover, the electric oven may further include partition plates 910 and 920 between the heater cover 400 and the outer case 100 for effective cooling of the heater cover 400 and the heaters 410 and 420.

There may be a fifth heater 450 of sheath grill heater in an upper part of the cooking cavity 250, and, though not shown, there may be a fourth heater in the fan housing 600 like the second embodiment. Like the embodiment in FIG. 2, there may be a temperature sensor at a position adjacent to the first heater 410 and/or a temperature sensor in the cooking cavity 250.

While descriptions of the components, similar to the descriptions made with reference to FIGS. 2 and 4, are omitted, the operation of the electric oven of the variation of the second embodiment will be described, taking a case when all components are provided as shown in FIG. 5 as an example.

When the power is provided to the electric oven, the first heater 410 and the second heater 420 generate heat to heat the food in the cooking cavity 250. At the same time, the second fan 710 draws air from the cooking cavity 250 and supplies the air to the first heater 410 and the second heater 420, to cool the heaters 410 and 420 effectively, and heated air circulates through the cooking cavity 250 and heats the food, uniformly. Of course, the third heater 430 and the fifth heater 450 also heat the food uniformly.

In the meantime, the air drawn through the air inlet holes 110 and 120 as the fan 800 rotates cools the bottom sides and rear sides of the inner case 200 and the outer case 100 respectively, as well as cools the fan motor 720 for rotating the second fan 710. The air from the fan 800 is divided into a plurality of laminar flows by the partition plates 910 and 920, and discharged to the outside of the electric oven through the air outlet holes 130. Since the heater cover 400 is cooled effectively in this process, the heater cover 400 and the heaters 410 and 420 are not overheated.

Thus, the electric oven in accordance with the variation of the second embodiment of the present invention has all advantages of the first embodiment and the second embodiment.

Figure 6:
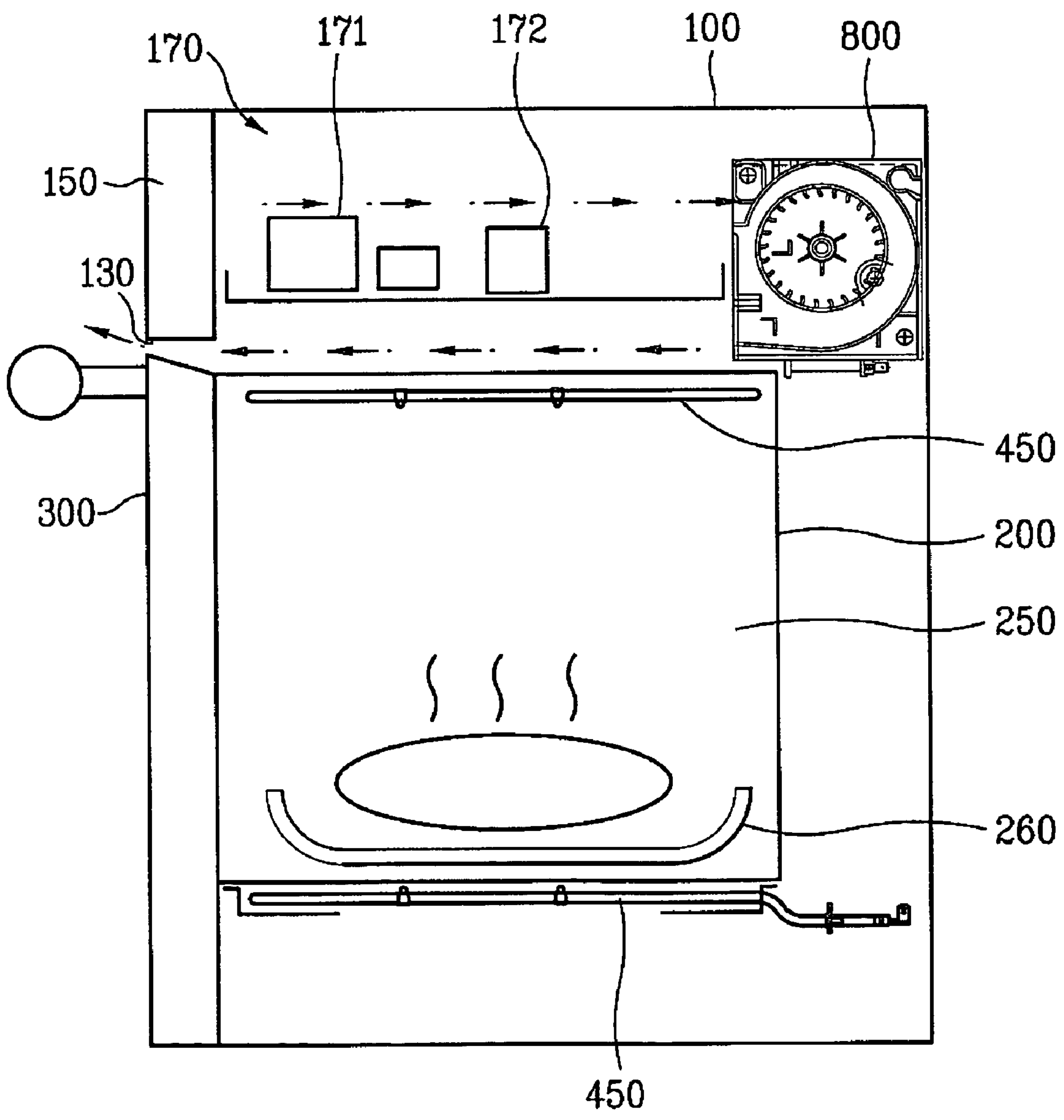
FIG. 6 illustrates a diagram showing an electric oven having a fan provided thereto for cooling an inside thereof in accordance with a preferred embodiment of the present invention.
Figure 7:
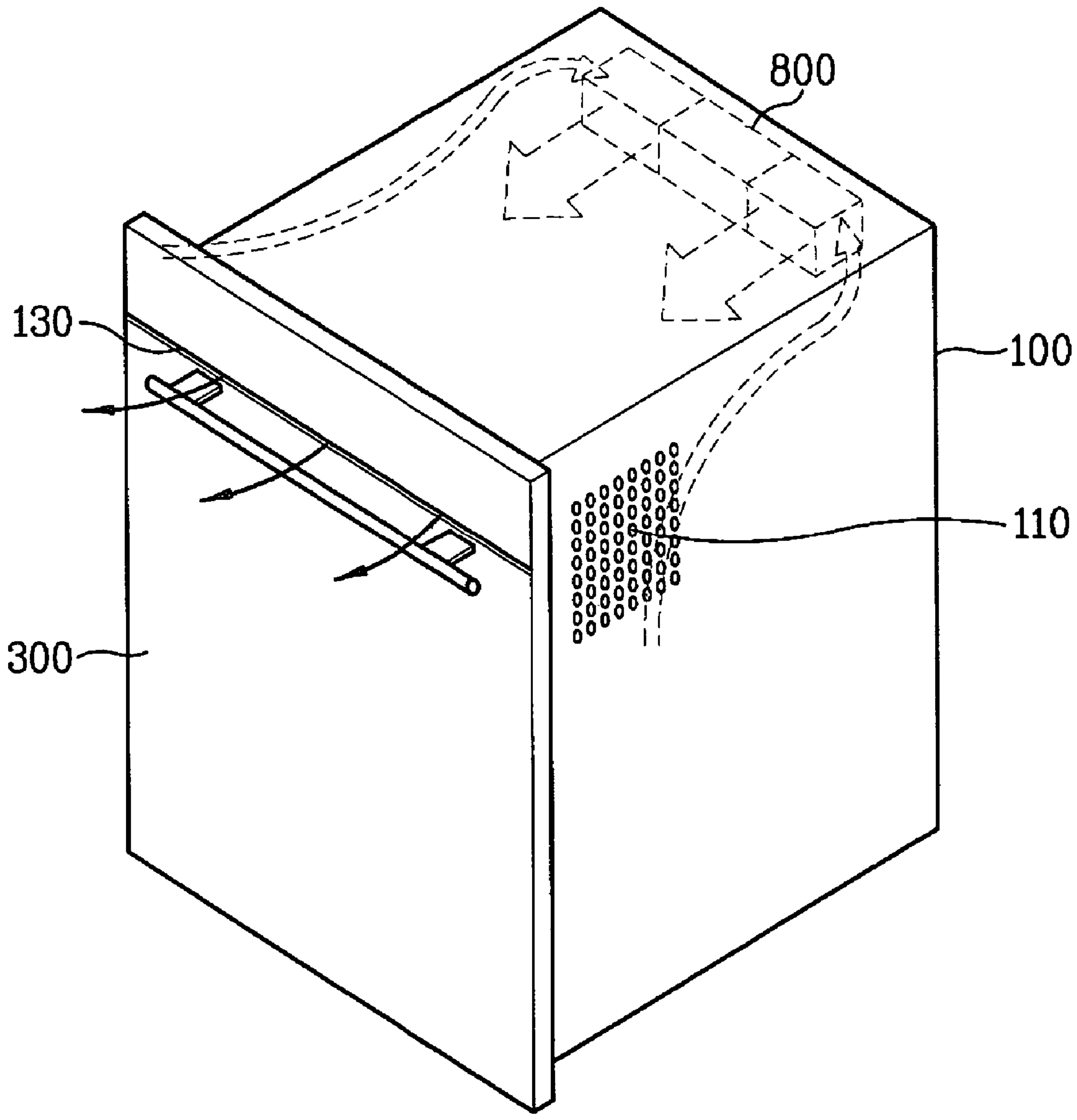
FIG. 7 illustrates a perspective view showing an air flow in the electric oven in FIG. 6.

FIG. 6 illustrates a diagram showing an electric oven having a fan provided thereto for cooling an inside thereof in accordance with a preferred embodiment of the present invention, and FIG. 7 illustrates a perspective view showing an air flow in the electric oven in FIG. 6.

Referring to FIGS. 6 and 7, there is an inner case 100 in an outer case 100, and a door 300 is mounted to a front surface of the outer case 100 for opening/closing the cooking cavity 250, an inside space of the inner case 200. The cooking cavity 250 is provided with a tray 260, and a heater 260 for heating the food on the tray 260. The heater 450 may be at least one selected from ceramic heaters, halogen heaters, and sheath grill heaters.

A space of the outer case 100 over the inner case 200 is used as an outfit chamber 170. As shown in FIG. 6, in the outfit chamber 170, there are a transformer 172, a magnetron 171, and the like for directing a microwave to the cooking cavity 250. There is a front surface plate 150 in a front surface of the outer case 100 at a position of the outfit chamber 170.

Referring to FIG. 7, there are air inlet holes 110 in a side of the outer case 100, and an air outlet hole 130 in the front surface thereof. As shown in FIG. 6, it is preferable that the air outlet hole 130 is provided between a lower edge of the front surface plate 150 and an upper edge of the door 300. As shown in FIG. 6, a fan 800 is provided above an upper part of rear of the inner case 200 for cooling the outfit chamber 170.

When power is provided to the electric oven, the food on the tray 260 is cooked as the heater 450 is heated. At the same time, the fan 800 comes into operation, to introduce an external air into the outfit chamber 170 through the air inlet holes 110. The air introduced into the outfit chamber 170 is discharged after introduced into the fan 800 to cool the magnetron 171 and the transformer 172. As shown in FIGS. 6 and 7, the air discharged from the fan 800 is discharged to an outside of the electric oven through the air outlet holes 130.

A temperature of the cooking cavity rises as the cooking progresses, to transmit the heat of the cooking cavity 250 to the door 300. Consequently, since the door 300 can be heated to a high temperature when the food is cooked for a long time period, it is likely that accidents, such a burn of the user, caused by negligence of safety can be taken place. According to this, a structural modification is required, in which the door 300 is cooled for preventing occurrence of the accidents caused by negligence of safety.

Figure 8:
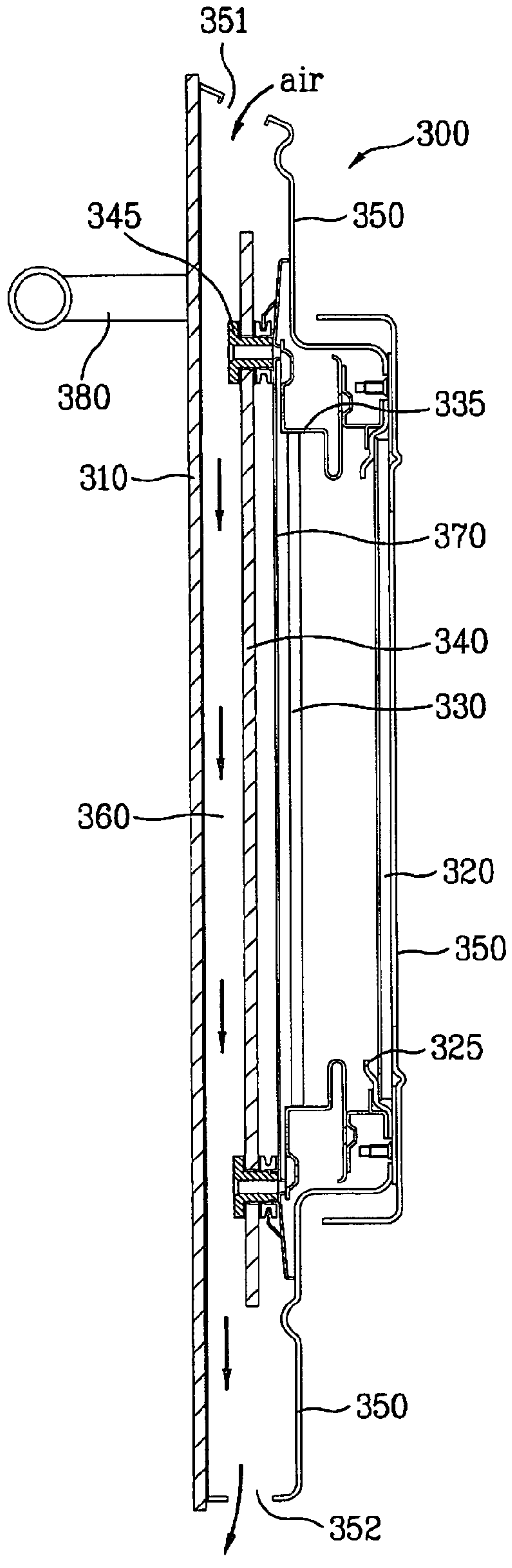
FIG. 8 illustrates a section showing a door of an electric oven in accordance with a third preferred embodiment of the present invention.

The third embodiment of the present invention provides a structure for solving the foregoing problem. FIG. 8 illustrates a section showing a door of an electric oven in accordance with a third preferred embodiment of the present invention, FIG. 9 illustrates a diagram showing an electric oven having the door in FIG. 8 applied thereto in accordance with a third preferred embodiment of the present invention, and FIG. 10 illustrates a perspective view showing an air flow in the electric oven in FIG. 9.

Figure 9:
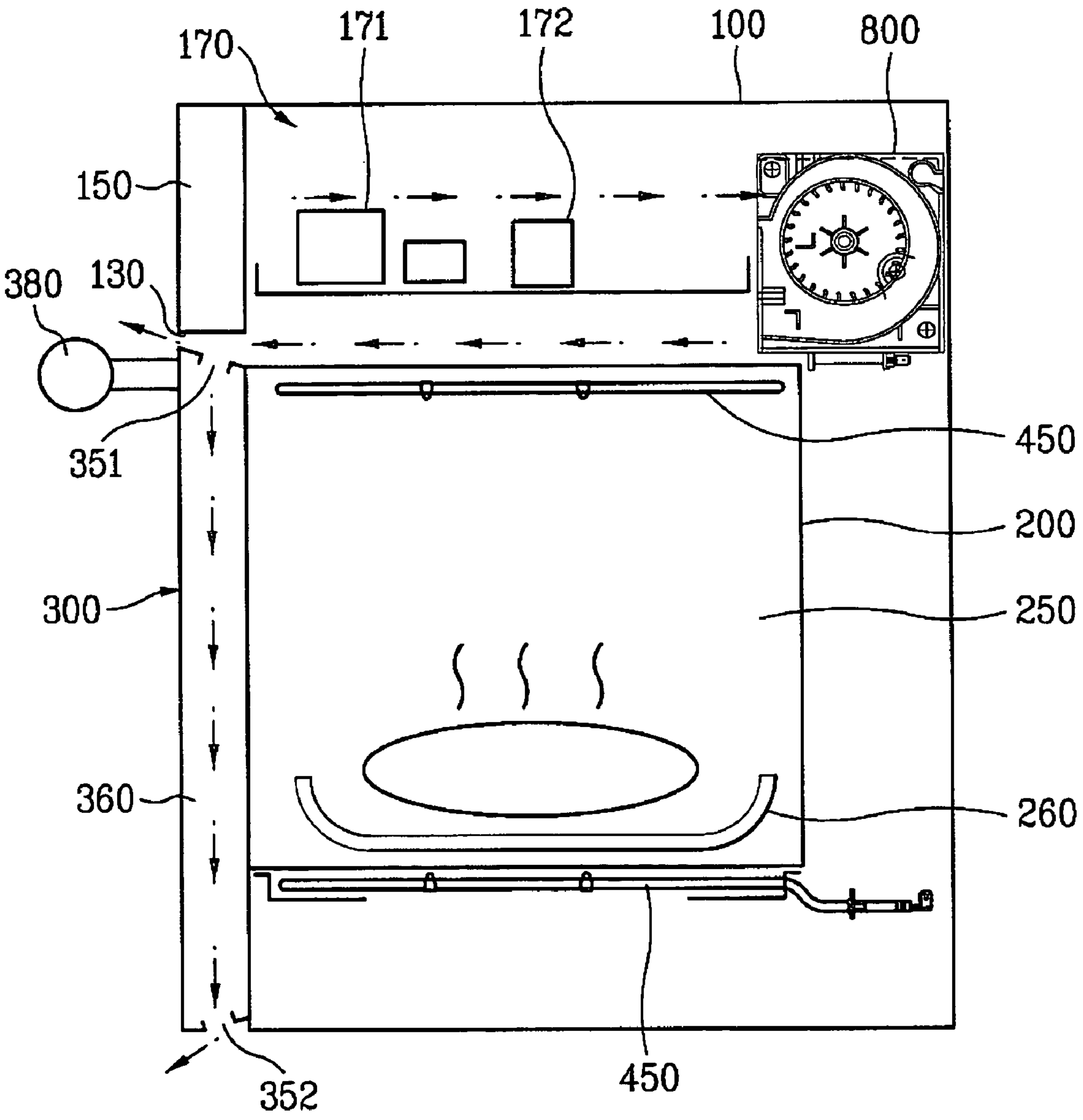
FIG. 9 illustrates a diagram showing an electric oven having the door in FIG. 8 applied thereto in accordance with a third preferred embodiment of the present invention.
Figure 10:
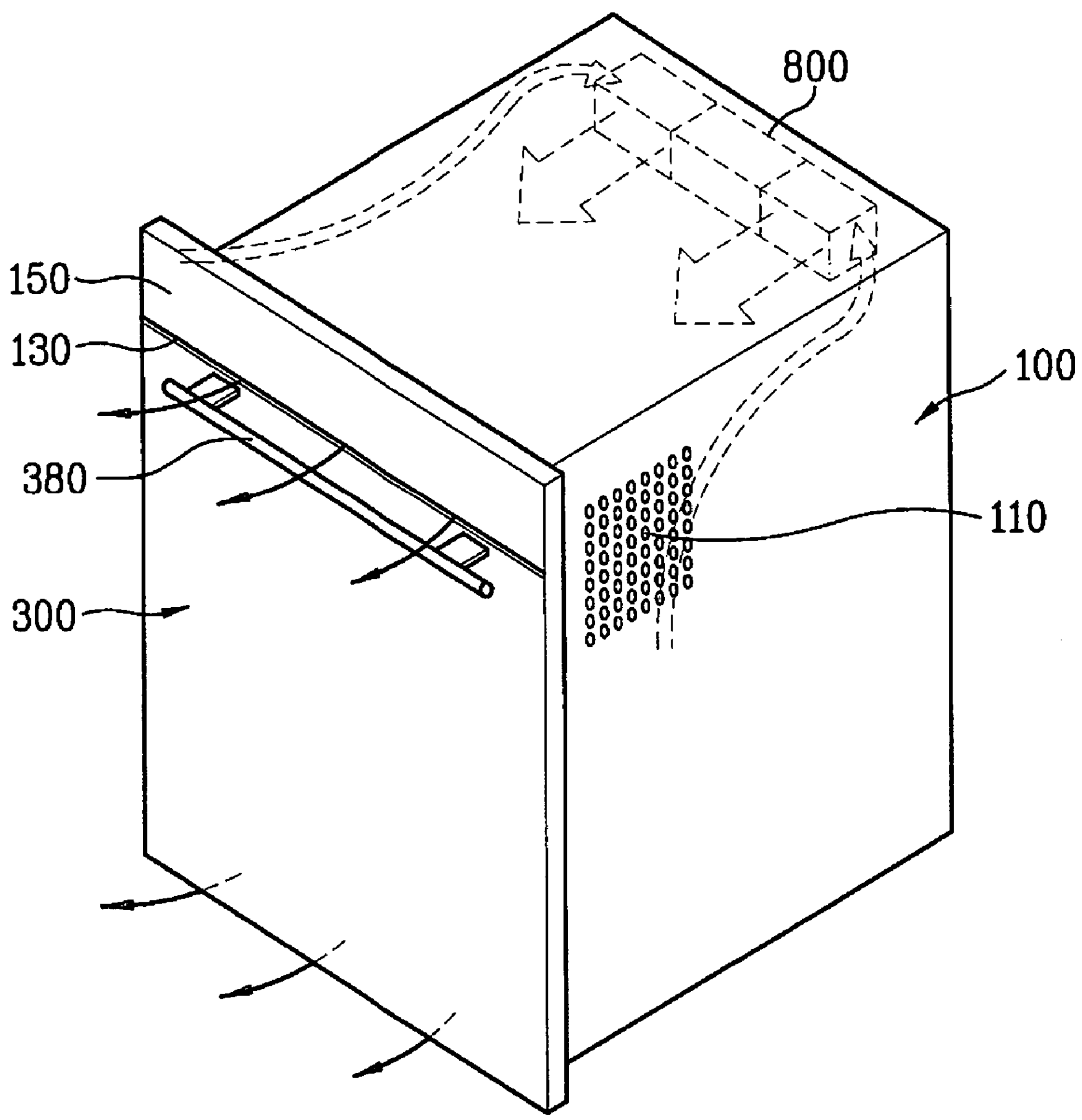
FIG. 10 illustrates a perspective view showing an air flow in the electric oven in FIG. 9.

Referring to FIGS. 8 and 9, the electric oven includes an outer case 100, an inner case 200, a door 300, a fan 800, and an outfit chamber 170. As can be noted in comparison of FIGS. 6 and 9, the third embodiment electric oven is similar to the electric oven described with reference to FIG. 6, except that the door 300 in the third embodiment, mounted to a front part of the outer case 100 for opening/closing the cooking cavity 250, has an improved structure better than the door shown in FIG. 6. Accordingly, the improved structure of the third embodiment door 300 will be described.

Referring to FIG. 8, the door 300 includes a plurality of plates 310, 320, 330, and 340 of glass, and a door frame 350 in rear of the plates 310, 320, 330, and 340 of glass having an air inlet hole 351 and an air outlet hole 352, and an air passage 360 between the air inlet hole 351 and the air outlet hole 352. As shown in FIG. 8, of the plates 310, 320, 330, and 340, the front plate 310 is arranged in a front part of the door 300, and the door frame 350 is fitted to a rear side of the front plate 310. There is a space between the front plate 310 and the door frame 350 between which the first to third plates 320, 330, and 340 of glass are provided. The first plate 310 is arranged close to the cooking cavity 250, and the third plate 340 is adjacent to the front plate 310, and the second plate 330 is arranged between the first plate 320 and the third plate 340. The first to third plates 320, 330, and 340 are fastened to the door frame 350 with first to third holders 325, 335, and 345. Meanwhile, for convenience of the user, a hand grip 380 may be provided in the front surface of the door 300.

In the meantime, there is a high frequency shielding plate 370 in the third embodiment door 300 of the present invention for preventing leakage of a microwave to the outside of the electric oven. The high frequency shielding plate 370, provided between the second plate 330 and the third plate 340, has a plurality of holes for the user to see through the cooking cavity 250.

In the meantime, the air inlet hole 351 and the air outlet hole 352 are formed in sides of the door frame 350. For example, if the air outlet holes 130 for discharging the air from the fan 800 is formed between the door 300 and the front plate 150, the air inlet hole 351 and the air outlet hole 352 are formed in an upper side and a lower side of the door frame, respectively. It is preferable that the air passage making the air inlet hole 351 and the air outlet hole 352 in communication is provided in rear of the front plate 310 of the inside of the door 300 for pass of the air. Because the front plate 310 is exposed to the outside of the electric oven, this is for dropping a temperature of the front plate 310 by direct cooling of the front plate 310 with the air discharged from the fan 800.

In the meantime, since the door 300 has a structure in which inside of the door 300 is empty, with a plurality of plates 320, 330, and 340 of glass arranged therein, no separate formation of the air passage is required, but the empty space in the door 300 serves as the air passage 360 once the air inlet hole 351 and the air outlet hole 352 are formed in side surfaces of the door frame 350. It is preferable that the air inlet hole 351 is formed at a position where the air from the fan 800 is introduced into the door 300 through the inlet hole 351, and moves along a rear surface of the first plate 310.

An air flow in the electric oven in accordance with the third preferred embodiment of the present invention will be described. When the electric oven is put into operation to start cooking, either the microwave from the magnetron 171 in the outfit chamber 170 is directed to the food on the tray 260 in the cooking cavity 250, or the heater 450 heats the food to cook the food. During the electric oven is in operation, the components in the outfit chamber 170 emit heat.

Referring to FIG. 10, since the fan 800 also rotates along with operation of the electric oven, external air is introduced into the outfit chamber 170 through the air inlet hole 110 and 120 in the side of the outer case 100. The air introduced into the outfit chamber 170 is drawn into the fan 800, and the fan 800 blows the air toward the air outlet holes 130 between the front plate 150 and the door 300 as shown in FIG. 9. In this process, various components in the outfit chamber 170 are cooled.

Referring to FIGS. 9 and 10, a portion of the air blown toward the air outlet holes 130 from the fan 800 is discharged to the outside of the electric oven, and rest of the air is introduced into the air inlet hole 351 in the front plate 310 of glass. The air introduced into the air inlet hole 351 moves along the rear surface of the front plate 310, and discharged to the outside of the electric oven through the air outlet hole 352. Since the front plate 310 is cooled down in this process, the third embodiment electric oven of the present invention can prevent accidents caused by negligence of safety coming from the heated door 300.

The third embodiment electric oven of the present invention cools the door with the air that cools the outfit chamber. According to this, the door can be maintained at a safe temperature, to prevent the accidents. Moreover, the air inlet hole and the air outlet hole in the door for cooling the door have very simple structure. Since additional change of structure or addition of component is not required, cost is reduced.

The electric oven of the present invention has the following advantages.

In the first preferred embodiment of the present invention, since the fan at one side of the cooking cavity circulates air through the cooking cavity uniformly, partial heating of the cooking cavity and the food can be prevented, thereby preventing accidents caused by negligence of safety, and permitting uniform heating of the food.

In the first preferred embodiment of the present invention, the fan at one side of the cooking cavity blows air and cools the heaters to prevent overheating of the heater. According to this, accidents caused by negligence of safety coming from overheating of the heaters and heater cover can be prevented, and reduction of a lifetime of the heaters can be prevented.

By elevating the temperature of the cooking cavity uniformly with the sheath grill heater and/or other supplemental heaters when the temperature of the halogen heater is low in an initial cooking process, the method for controlling an electric oven of the present invention can prevent partial heating of the cooking cavity, and reduce a load on the halogen heater. The power to the sheath grill heater and/or other supplemental heaters is cut off when the temperature of the halogen heater is high, overheating of the heaters and the cooking cavity can be prevented.

The electric oven in accordance with the second preferred embodiment of the present invention prevents overheating of the cooking cavity and the heaters, because the air circulated by the fan between the inner case and the outer case cools all the bottom sides, rear sides, and upper sides of the inner case and the outer case. According to this, occurrence of the accidents caused by negligence of safety, and reduction of a lifetime of the heaters can be prevented.

In the second preferred embodiment of the present invention, the partition plates provided to the upper part of the heater cover cools upper sides of the heater cover and the inner case, effectively. According to this, occurrence of the accidents caused by negligence of safety, and reduction of a lifetime of the heaters can be prevented.

The variation of the second preferred embodiment of the present invention has the advantages both of the first and second embodiments.

The electric oven in accordance with the third preferred embodiment of the present invention can prevent accidents caused by negligence of safety coming from overheating of the door, because the door is cooled by the air which cools the outfit chamber.

According to the third preferred embodiment of the present invention, what is required for cooling the door is formation of the air inlet hole and the air outlet hole in sides of the door. According to this, since no separate structural change and no addition of components are required, safety of the product can be enhanced with a low cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electric oven comprising:

a cooking cavity surrounded by an inner case and being openable by a door;

a first heater for heating the cooking cavity;

at least one supplemental heater for heating the cooking cavity; and a controller operating the first heater to generate heat when starting cooking and selectively operating the at least one supplemental heater during cooking, wherein the first heater is located over the cooking cavity, wherein the controller selectively operates the supplemental heater based on a temperature of the first heater or based on a temperature of the cooking cavity, and wherein the controller operates the at least one supplemental heater when a rising rate of the temperature of the first heater or the temperature of the cooking cavity in a time period fails to reach a preset rate value, and the controller stops operating the at least one supplemental heater when the rising rate of the temperature of the first heater or the temperature of the cooking cavity reaches the preset rate value.

2. The electric oven as claimed in claim 1, wherein the first heater comprises a halogen heater.

3. The electric oven as claimed in claim 1, wherein the at least one supplemental heater is located in the cooking cavity.

4. The electric oven as claimed in claim 3, wherein the at least one supplemental heater includes at least one second heater located at a rear portion of the cooking cavity.

5. The electric oven as claimed in claim 3, wherein the at least one supplemental heater includes at least one second heater located at an upper portion of the cooking cavity.

6. The electric oven as claimed in claim 1, wherein the inner case includes a plurality of holes in an upper part of the inner case, and wherein the first heater is located over the plurality of holes, and the at least one supplemental heater is located in the cooking cavity.

7. The electric oven as claimed in claim 6, further comprising a magnetron for providing the cooking cavity with microwaves, wherein the plurality of holes are configured to prevent the microwaves in the cooking cavity from being transmitted to the first heater, thereby protecting the first heater.

8. The electric oven as claimed in claim 7, further comprising a fan located in the cooking cavity, the fan drawing air from the cooking cavity and blowing a portion, or all of the air toward the first heater.

9. The electric oven as claimed in claim 1, further comprising:

a fan housing attached to an inside wall of the inner case, the fan housing having a plurality of apertures; and a fan between the fan housing and the inside wall of the inner case, for drawing air from the cooking cavity and blowing a portion, or all of the air toward the first heater.

10. The electric oven as claimed in claim 9, further comprising a magnetron for providing the cooking cavity with microwaves, wherein the plurality of apertures are configured to prevent the microwaves in the cooking cavity from being transmitted to the fan, thereby protecting the fan.

11. The electric oven as claimed in claim 10, wherein the at least one supplemental heater includes at least one second heater located between the fan housing and the inside wall of the inner case.

12. The electric oven as claimed in claim 9, wherein the controller operates the at least one supplemental heater with a duty cycle to heat the cooking cavity, the duty cycle having an on-time period and an off time period, the controller varying a ratio of the on-time period in the duty cycle after a predetermined time period passes starting from an operation of the at least one supplemental heater, the controller operates the fan to form a convection in the cooking cavity when the temperature of the first heater or the temperature of the cooking cavity reaches a preset temperature, and the controller reduces the ratio of the on-time period in the duty cycle after the predetermined time period passes starting from the operation of the at least one supplemental heater.

13. The electric oven as claimed in claim 9, wherein the controller operates the at least one supplemental heater with a duty cycle to heat the cooking cavity, the duty cycle having an on-time period and an off time period, the controller varying a ratio of the on-time period in the duty cycle after a predetermined time period passes starting from an operation of the at least one supplemental heater, the controller operates the fan to form a convection in the cooking cavity when a preset time period passes starting from an operation of the first heater, and the controller reduces the ratio of the on-time period in the duty cycle after the predetermined time period passes starting from the operation of the at least one supplemental heater.

14. The electric oven as claimed in claim 1, wherein the at least one supplemental heater includes at least one second heater located over a front portion of the cooking cavity, and wherein the first heater is located over a rear portion of the cooking cavity.

15. The electric oven as claimed in claim 1, wherein the controller selectively operates the supplemental heater based on a temperature of the first heater or based on a temperature of the cooking cavity.

16. The electric oven as claimed in claim 15, wherein the controller operates the at least one supplemental heater when the temperature of the first heater or the temperature of the cooking cavity is lower than a preset temperature, and the controller stops operating the at least one supplemental heater when the temperature of the first heater or the temperature of the cooking cavity is higher than the preset temperature.

17. The electric oven as claimed in claim 13, wherein the controller operates the at least one supplemental heater with the duty cycle when the temperature of the first heater or the temperature of the cooking cavity reaches a preset temperature, the duty cycle having an on-time period and an off time period, the controller reducing a ratio of the on-time period in the duty cycle after a predetermined time period passes starting from an operation of the at least one supplemental heater.

18. An electric oven comprising:

a cooking cavity surrounded by an inner case and being openable by a door;

a first heater for heating the cooking cavity;

at least one supplemental heater for heating the cooking cavity; and a controller operating the first heater to generate heat when starting cooking and selectively operating the at least one supplemental heater during cooking, wherein the controller selectively operates the supplemental heater based on a temperature of the first heater or based on a temperature of the cooking cavity, and wherein the controller operates the at least one supplemental heater when a rising rate of the temperature of the first heater or the temperature of the cooking cavity in a time period fails to reach a preset rate value, and the controller stops operating the at least one supplemental heater when the rising rate of the temperature of the first heater or the temperature of the cooking cavity reaches the preset rate value.

19. The electric oven as claimed in claim 18, wherein the at least one supplemental heater comprises a plurality of heaters, and wherein the controller, based on the temperature of the first heater or the temperature of the cooking cavity, selectively operates one of the plurality of heaters which has a largest heat output among the plurality of heaters when the rising rate of the temperature of the first heater or the temperature of the cooking cavity fails to reach the preset rate value in the time period.

* * * * *